(12) United States Patent
Moore

(10) Patent No.: US 9,688,214 B1
(45) Date of Patent: Jun. 27, 2017

(54) ATTACHMENT FOR A TOOLBOX

(71) Applicant: Kevin Moore, Litchfield Park, AZ (US)

(72) Inventor: Kevin Moore, Litchfield Park, AZ (US)

( * ) Notice: Subject to any disclaimer, the term of this patent is extended or adjusted under 35 U.S.C. 154(b) by 137 days.

(21) Appl. No.: 14/801,510

(22) Filed: Jul. 16, 2015

Related U.S. Application Data

(63) Continuation of application No. 13/066,419, filed on Apr. 14, 2011, now abandoned.

(51) Int. Cl.
  *B60R 9/06* (2006.01)
  *B60R 11/06* (2006.01)
  *B25H 3/02* (2006.01)

(52) U.S. Cl.
  CPC ............. *B60R 11/06* (2013.01); *B25H 3/02* (2013.01)

(58) Field of Classification Search
  USPC .................................................. 224/402–405
  See application file for complete search history.

(56) References Cited

U.S. PATENT DOCUMENTS

| | | | |
|---|---|---|---|
| 3,888,538 A | 6/1975 | McWilliams | |
| 5,127,564 A | 7/1992 | Romero | |
| 6,039,293 A | 3/2000 | Minet | |
| 6,296,581 B1 * | 10/2001 | Sever | A63B 47/002 473/415 |
| 6,536,733 B1 * | 3/2003 | Sharp | A45B 11/00 248/519 |
| 6,554,012 B2 * | 4/2003 | Patarra | A45B 3/00 135/16 |
| 6,679,408 B1 | 1/2004 | Thomas | |
| 7,448,584 B2 | 11/2008 | Chen | |
| 8,177,387 B2 * | 5/2012 | Noda | E02F 9/00 224/401 |
| 8,181,811 B1 * | 5/2012 | Blake | A45B 23/00 220/475 |
| 2003/0102322 A1 | 6/2003 | Jones | |
| 2004/0077436 A1 * | 4/2004 | Goucher | A63B 69/0002 473/451 |
| 2006/0289580 A1 | 12/2006 | Farver | |
| 2008/0110893 A1 * | 5/2008 | Cowie | B65D 19/08 220/324 |
| 2009/0065543 A1 | 3/2009 | Bone | |
| 2009/0101780 A1 | 4/2009 | Revelino | |
| 2009/0107028 A1 | 4/2009 | Mullins | |

\* cited by examiner

*Primary Examiner* — Adam Waggenspack
(74) *Attorney, Agent, or Firm* — Booth Udall Fuller, PLC

(57) ABSTRACT

An attachment for a toolbox comprising: a base section and a removable rack section, the base section comprises at least one horizontal support and at least one vertical support attached to the at least one horizontal support, the at least one vertical support has a receiving aperture sized to receive a bottom section of the rack section, located at terminal ends of each horizontal support are attachment tangs that include an attachment aperture, the removable rack section comprises of two pieces, a stem section and a prong section comprising a horizontal bar with retaining projections at teach end of the horizontal bar.

17 Claims, 16 Drawing Sheets

US 9,688,214 B1

ATTACHMENT FOR A TOOLBOX

CROSS REFERENCE TO RELATED APPLICATIONS

This Application is a continuation of U.S. Ser. No. 13/066,419, entitled "Attachment for a Toolbox" to Kevin Moore, filed Apr. 14, 2011, now pending, the disclosure of which is hereby incorporated by this reference.

FIELD OF THE INVENTION

The present invention relates generally to an attachment for a toolbox. More specifically, the attachment is used to hold or secure objects to the toolbox.

BACKGROUND

Truck owners tend to be practical types in that they tend to maximize the storage capacity of their trucks. One of the most common ways to maximize a truck's storage capacity is by adding truck bed toolboxes. The crossover truck toolbox is one of the most popular and useful designs, but it's by no means the only design available.

If you own a lot of tools that are large or have long handles, then installing a side truck toolboxes is a common storage solution.

However, there are frequently tools or other objects that are longer or bulkier than the toolbox. Thus there is a need for an attachment for the toolbox that allows securing these long or bulky objects to the toolbox.

SUMMARY OF THE INVENTION

It is an object of the present invention to provide an attachment for a toolbox that allows the securing of long objects to the toolbox.

It is another object of the present invention to provide an attachment for a toolbox that allows the securing of bulky objects to the toolbox.

It is yet another object of the present invention to provide an attachment for a toolbox that includes the ability to reposition at least a portion of the attachment in order to allow the user to reposition a stored object along the length of the toolbox.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. $112, paragraph 6 to define the invention. To the contrary, if the provisions of 35 U.S.C. $112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. $112, paragraph 6. Moreover, even if the provisions of 35 U.S.C. $112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DESCRIPTION OF PREFERRED EMBODIMENTS

Figure 1:
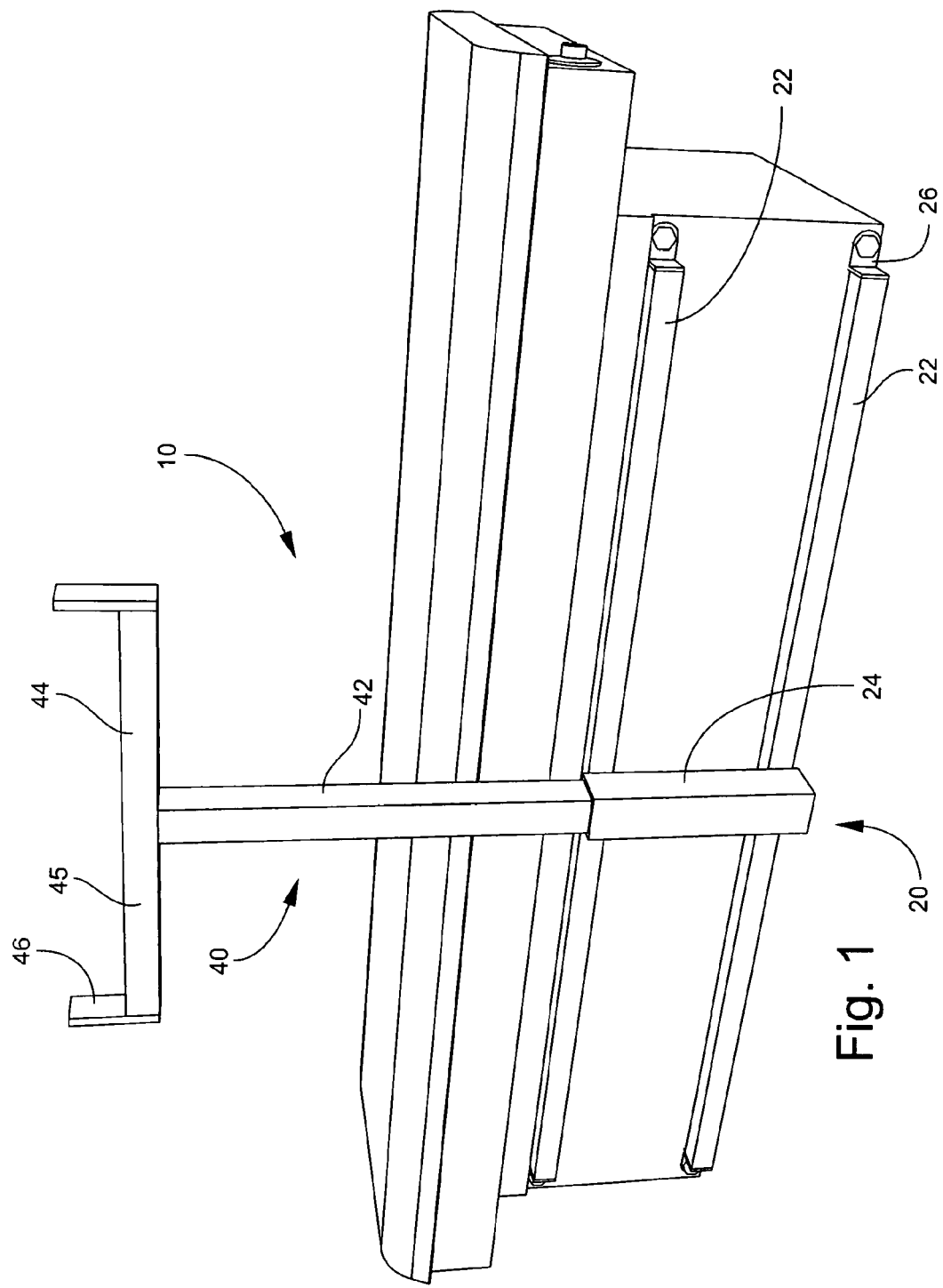
FIG. 1 is a perspective view of the present invention.
Figure 2:
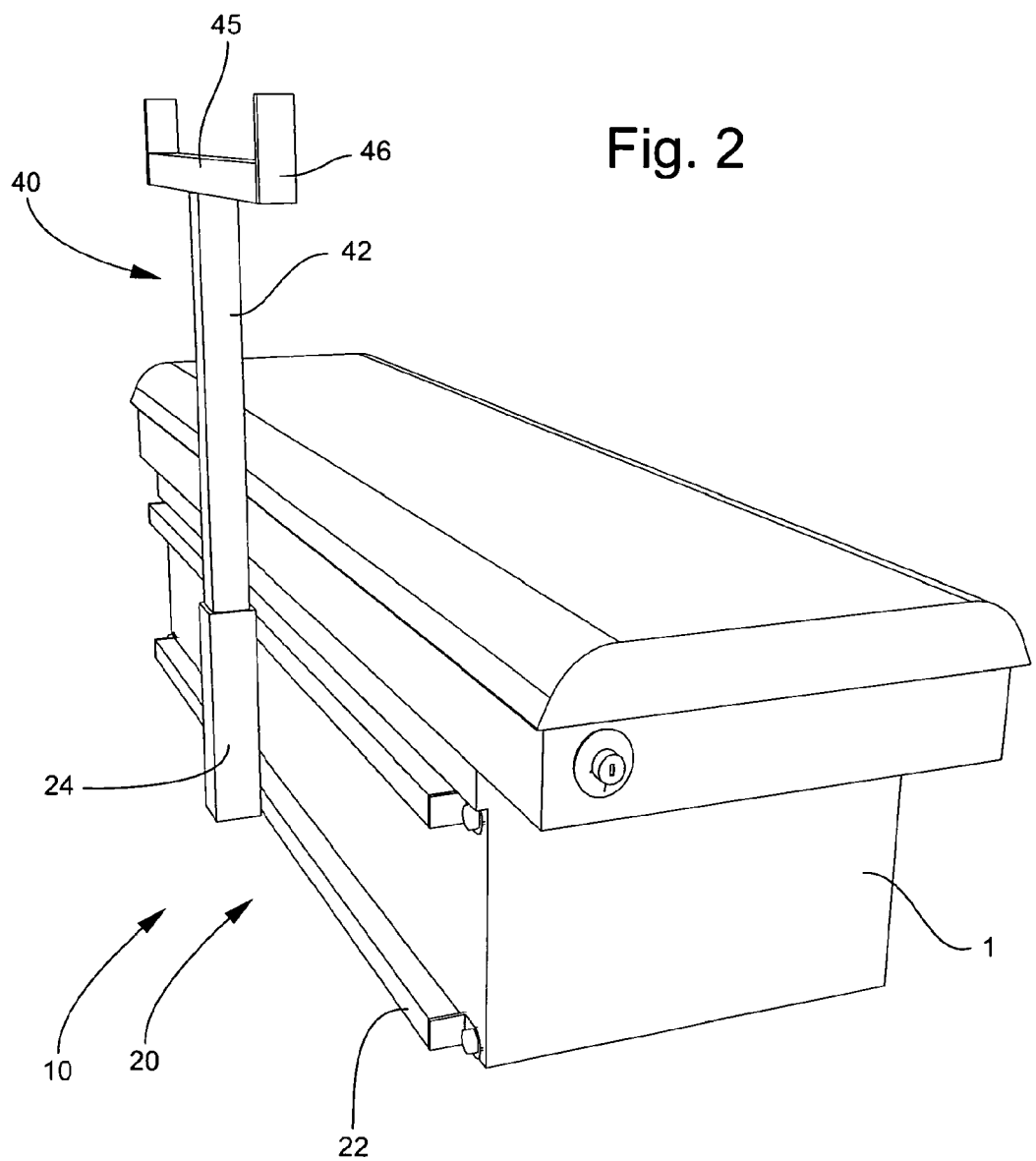
FIG. 2 is a second perspective view of the present invention.
Figure 3:
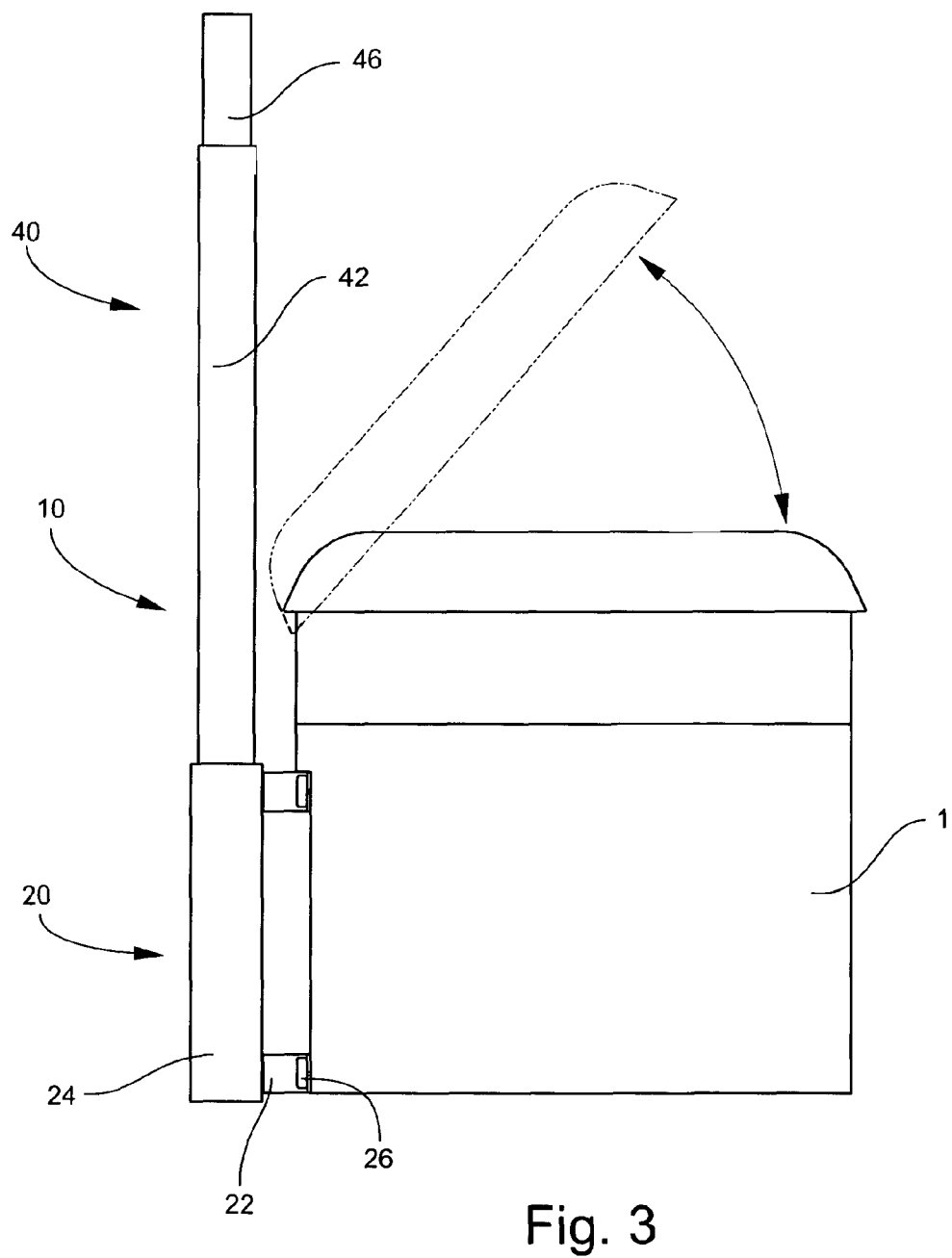
FIG. 3 is side view of the present invention.
Figure 4:
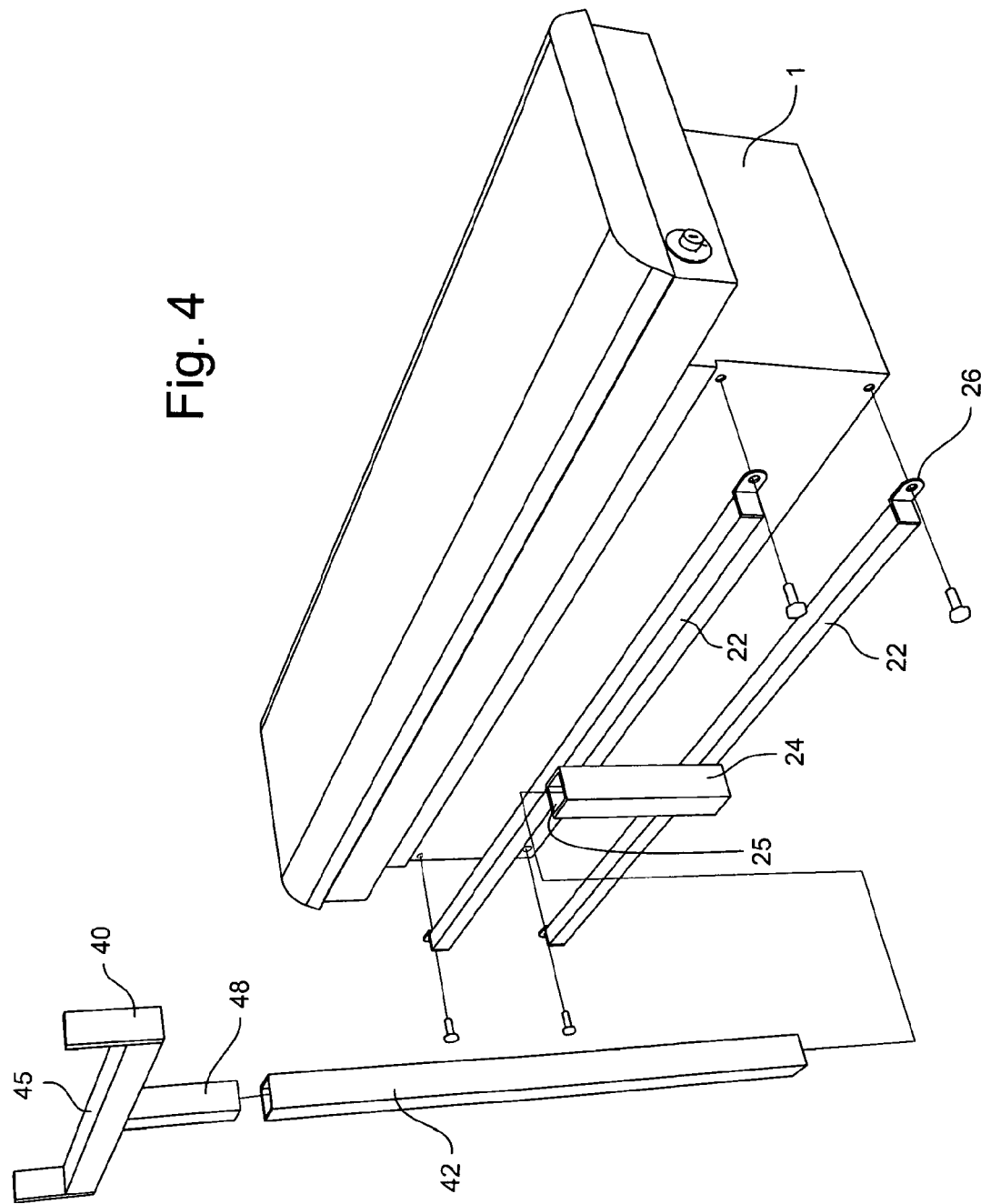
FIG. 4 is an exploded view of the present invention.

The device and method according to the present invention is a rack that is useful for securing objects to a toolbox.

With reference to the figures, the rack 10 according to the present invention is comprised of a base section 20 and a rack section 40.

In a first preferred embodiment, illustrated in FIG. 1 through FIG. 4, the base section 20 comprises at least one, preferably two, horizontal supports 22. Attached to the at least one horizontal supports 22 is at least one vertical support 24. In the most preferred embodiment, there are two horizontal supports 22 and at least one vertical support 24 that spans the distance between the two horizontal supports 22. In the most preferred form of this embodiment, the vertical support 24 is generally centrally located. However, alternate locations, such as either end of the base section 20 are considered to fall within the scope of the present invention.

In another version of this embodiment, not shown, there is more than one vertical support 24. There could be two, three, four or even more vertical supports 24 spaced along the length of the base section 20.

In the preferred embodiment, at least one of the at least one vertical support 24 has a receiving aperture 25 sized to receive a bottom section of the rack section 40. In the preferred embodiment, the receiving aperture 25 is a substantially square aperture.

Located at terminal ends of each horizontal support 22 are attachment tangs 26. Each attachment tang 26 has an included attachment aperture 27.

Figure 5:
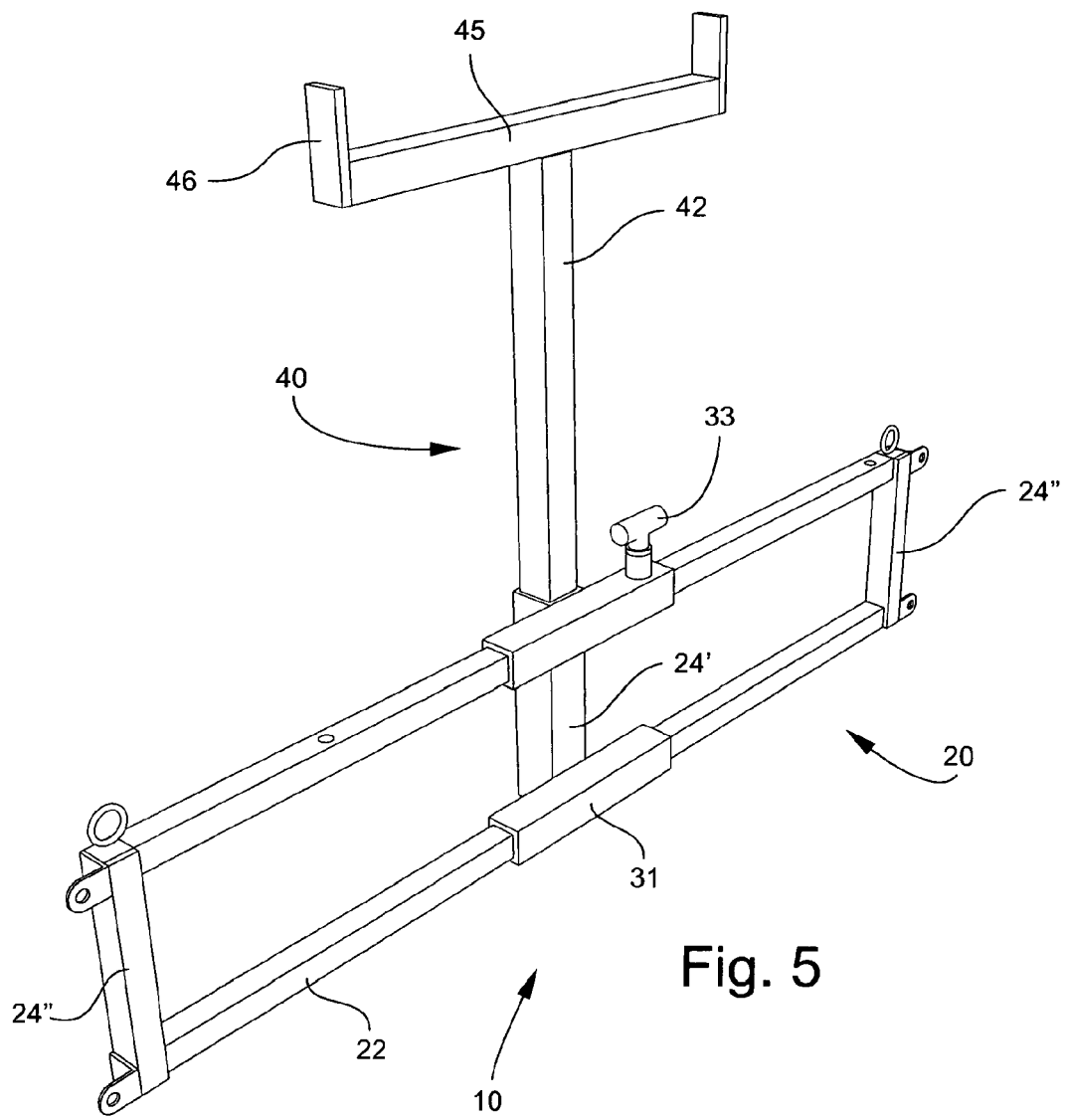
FIG. 5 is a perspective view of a second embodiment of the present invention.
Figure 7:
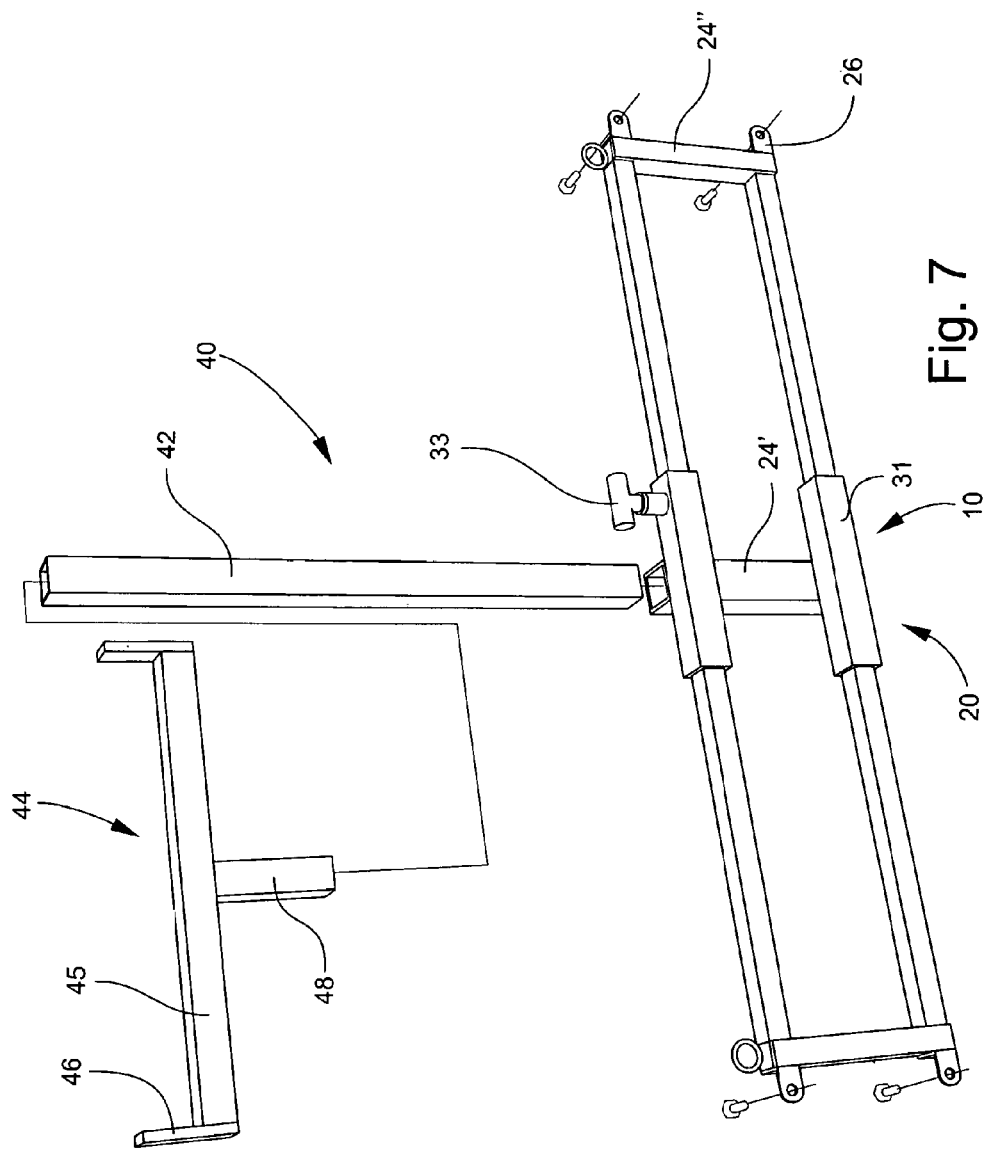
FIG. 7 is an exploded view of the second embodiment.
Figure 8:
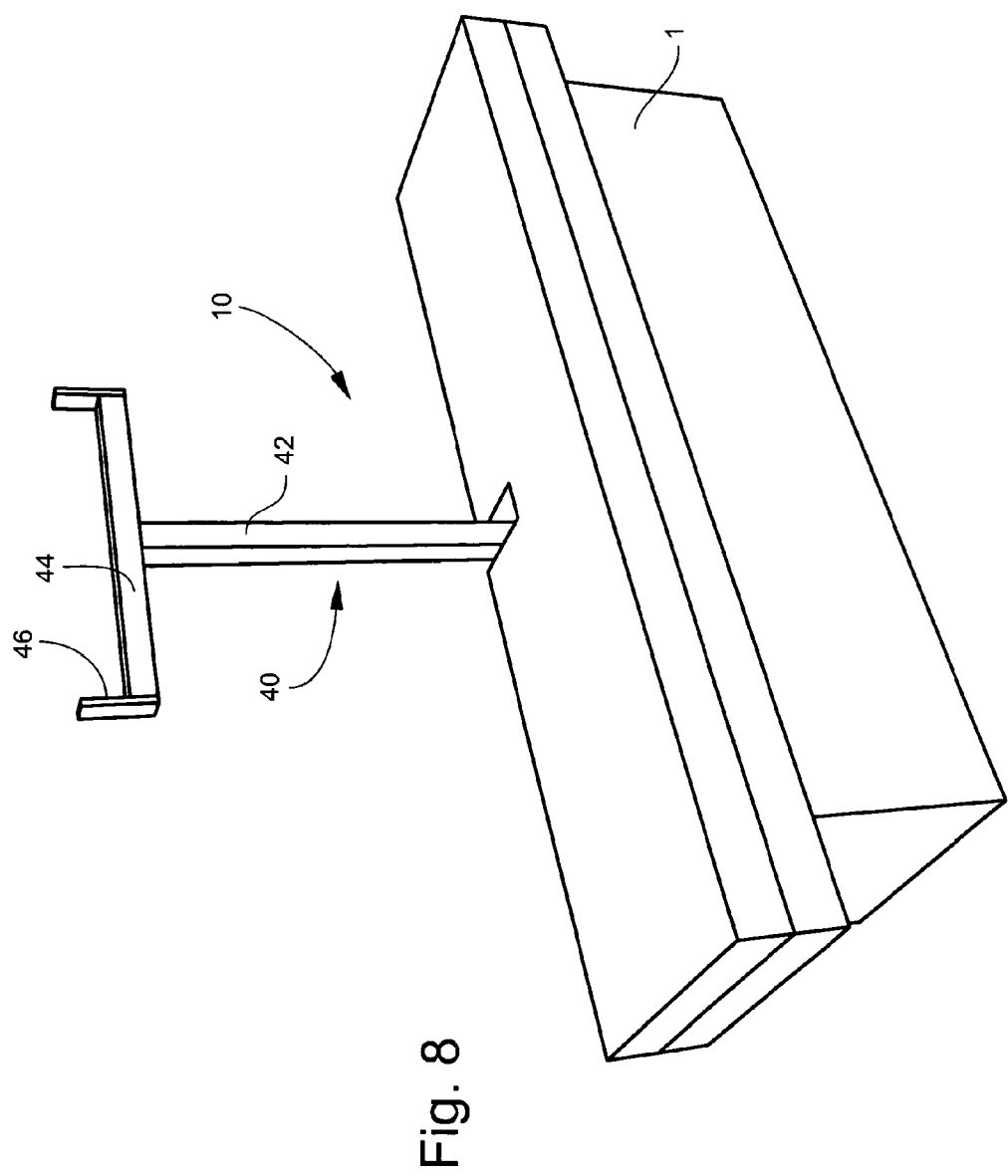
FIG. 8 illustrates a third embodiment of the present invention.

In a second preferred embodiment, illustrated in FIG. 5 though FIG. 7, the base section 20 comprises a least one, preferably two, horizontal supports 22. Attached to the at least one horizontal supports 22 is at least one movable vertical support 24'. In the most preferred embodiment, there are two horizontal supports 22 and a single movable vertical support 24' with two fixed vertical supports 24" that spans the distance between the two horizontal supports 22. In this second embodiment, the two fixed vertical supports 24" are located at opposite ends of the two horizontal supports 21. See FIG. 5.

In a preferred embodiment, the single movable vertical support 24' comprises two slide guides 31 sized to fit over and slide along the two horizontal supports 21. The single movable vertical support 24' is attached to and spans the distance between the two slide guides 31. A securing key 33 is included in at least one of the two slide guides 31 for locking the single movable vertical support system in place. Preferably the securing key is a threaded aperture with a matching threaded bolt.

Figure 6:
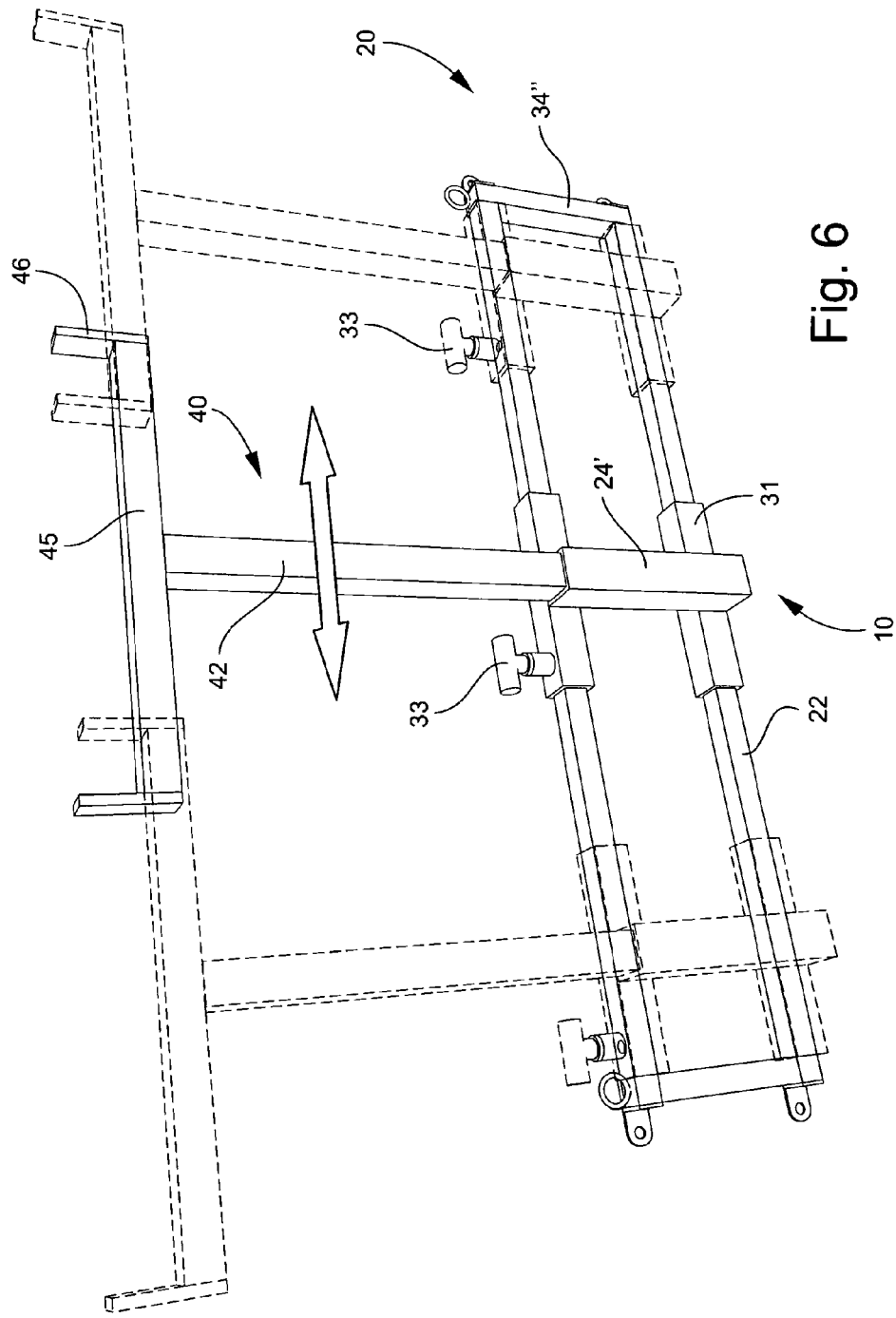
FIG. 6 illustrates the ability of the rack of the second embodiment to move along the rail system.

In a preferred embodiment, the plane of the horizontal supports 21 is slightly offset from the plane of the vertical supports 24' and 24". 'The offset is sufficient for the rack 10 to be mounted against a surface, such as the exterior surface of a toolbox, while allowing the single moveable vertical support 24' to be freely repositioned. See FIG. 6.

The rack section 40 according to the present invention is a removable section that mates with the vertical support 24 or movable vertical support 24'.

Figure 9:
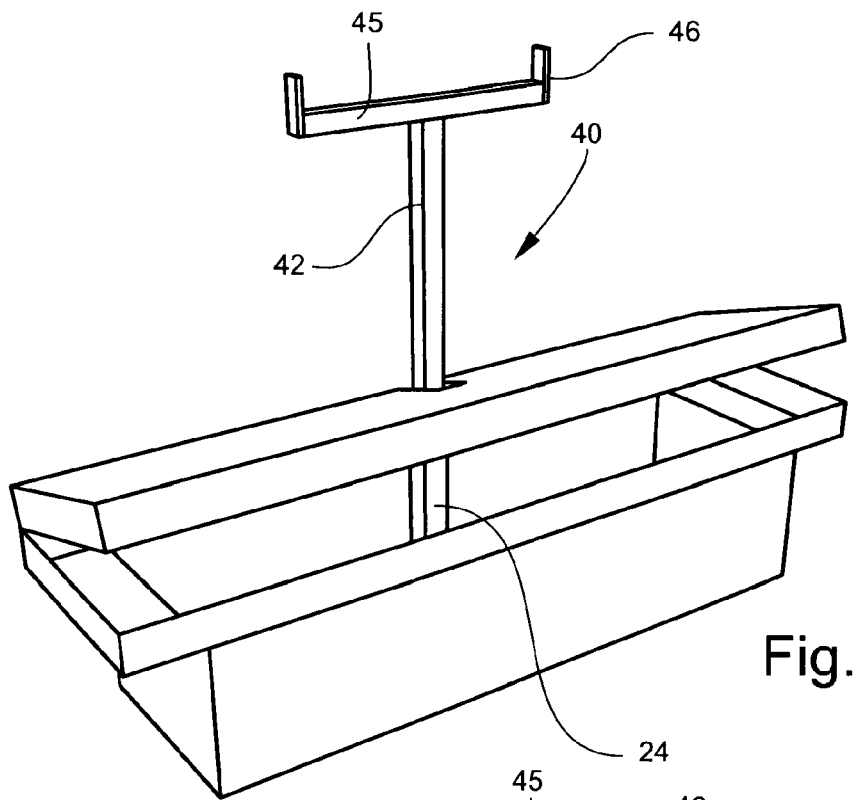
FIG. 9 and FIG. 10 illustrate the ability to access the interior of the toolbox when the third embodiment is in use.
Figure 10:
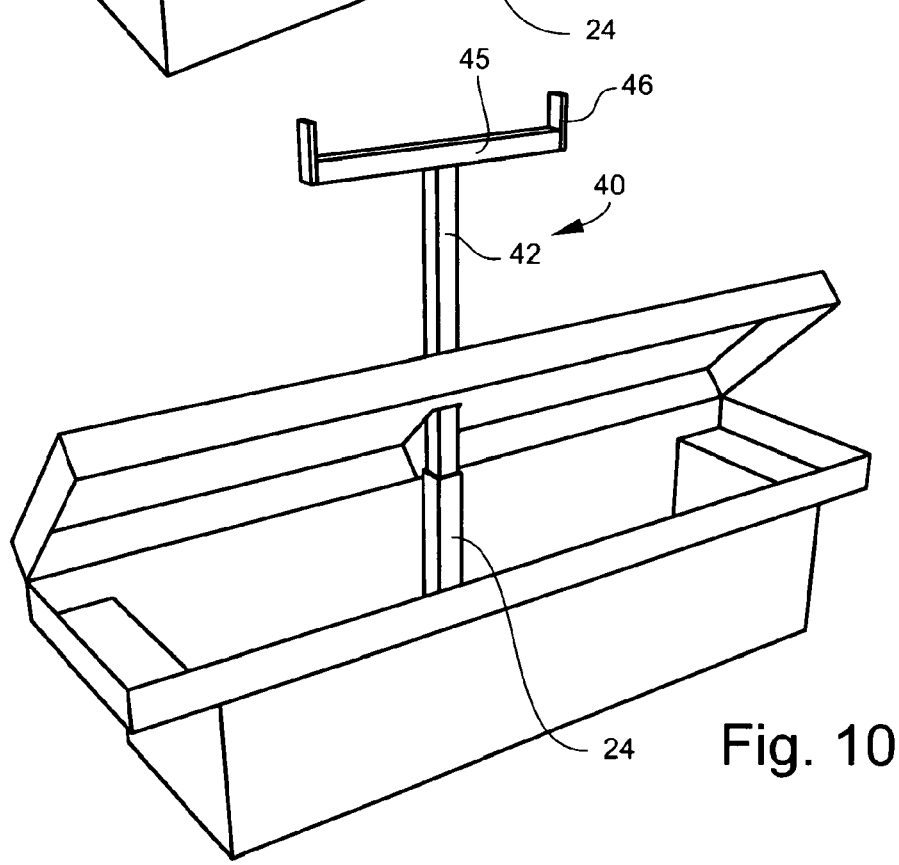
Figure 11:
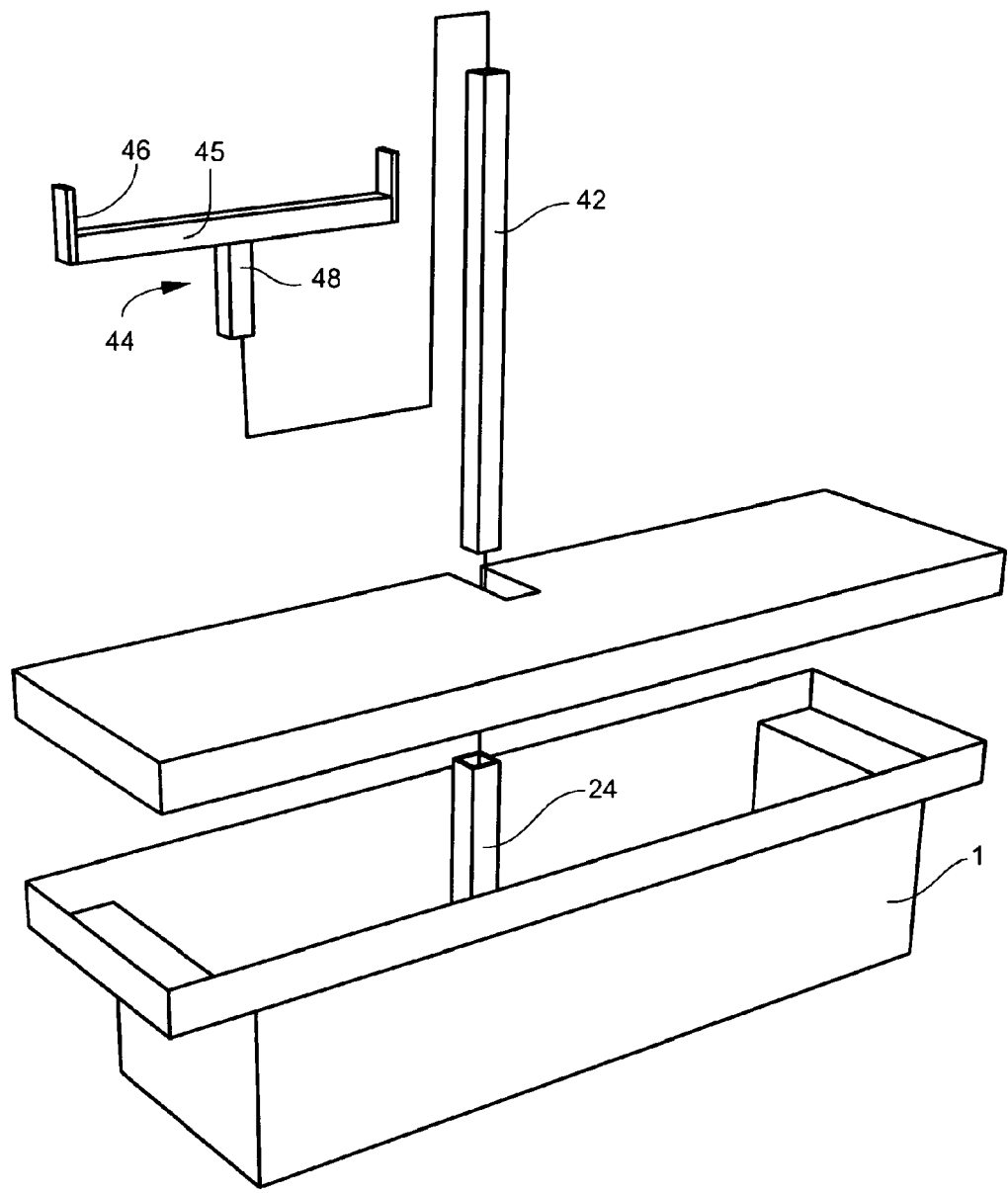
FIG. 11 is an exploded view of the third embodiment of the present invention.
Figure 12:
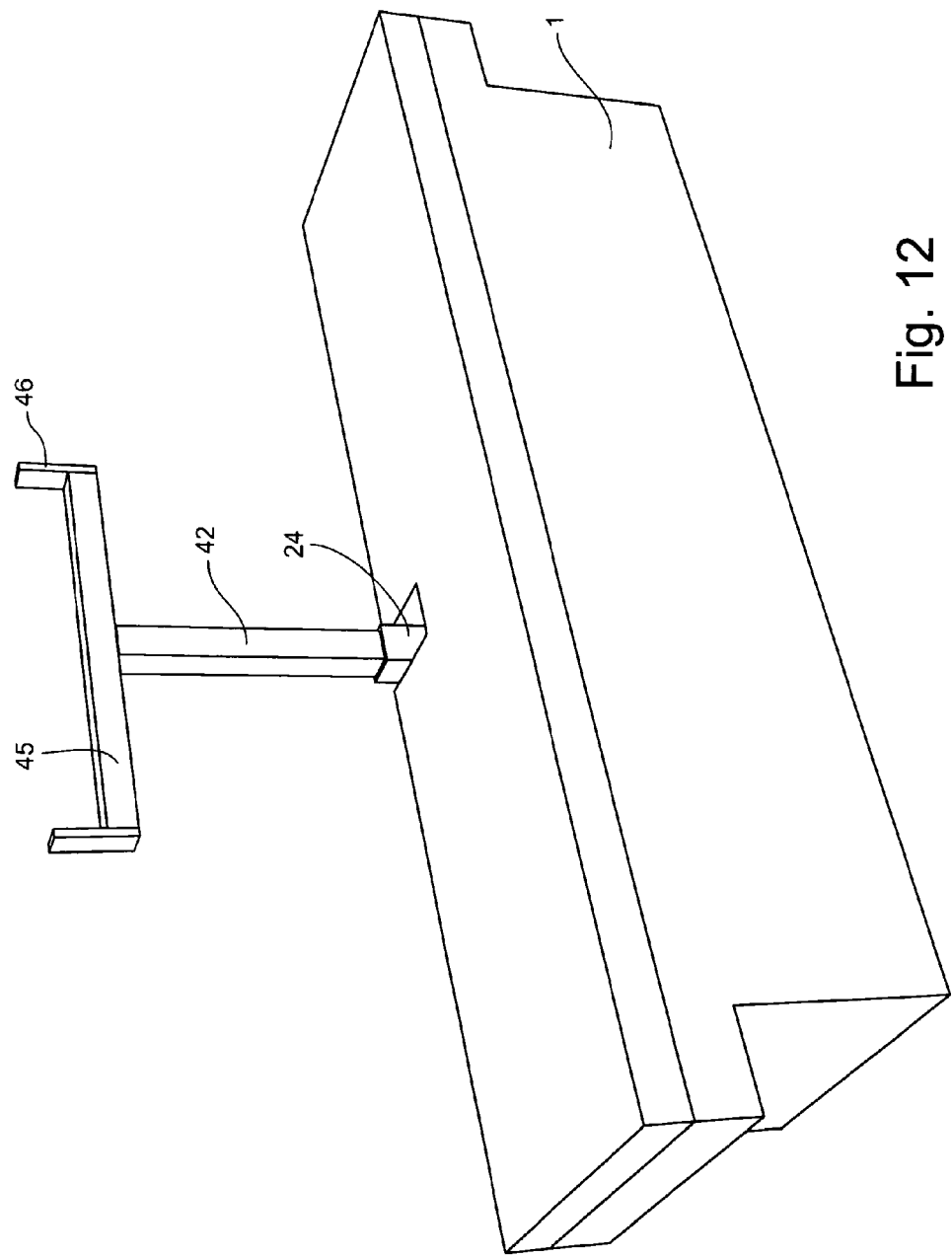
FIG. 12 illustrates a fourth embodiment of the present invention.
Figure 13:
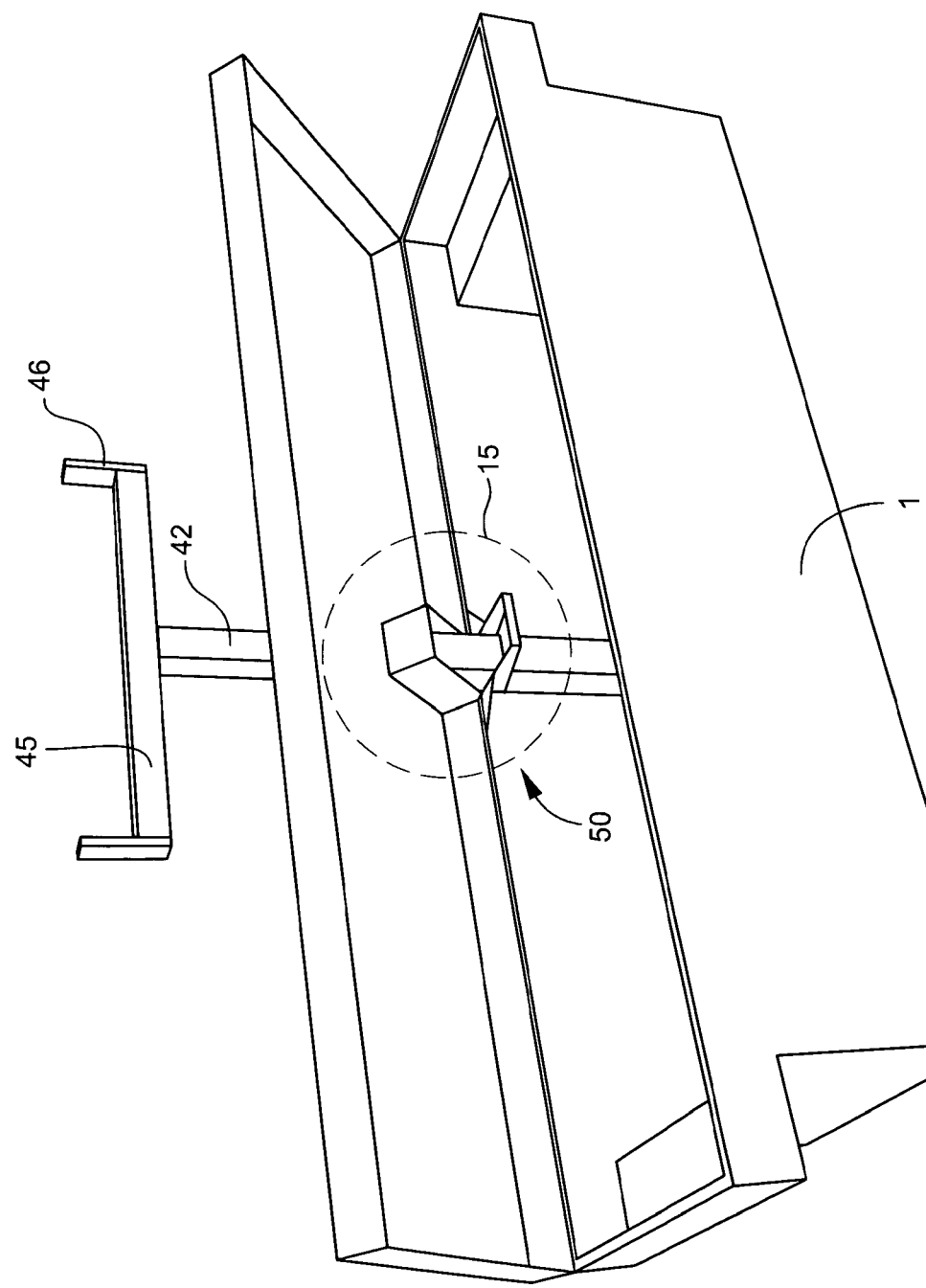
FIG. 13 illustrates the ability to access the interior of the toolbox when the fourth embodiment is in use.
Figure 14:
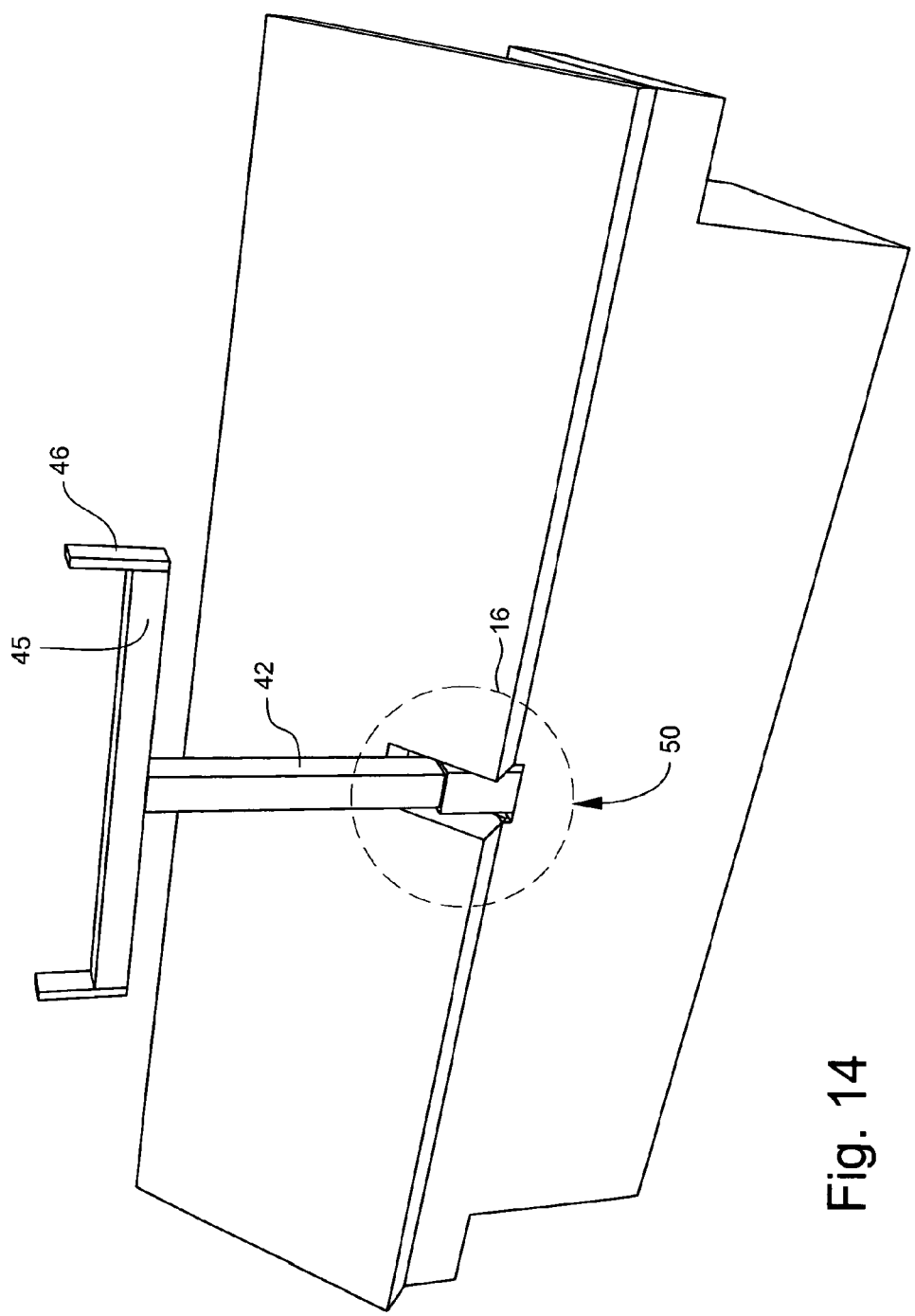
FIG. 14 is another view of the fourth embodiment with the toolbox partially open.
Figure 15:
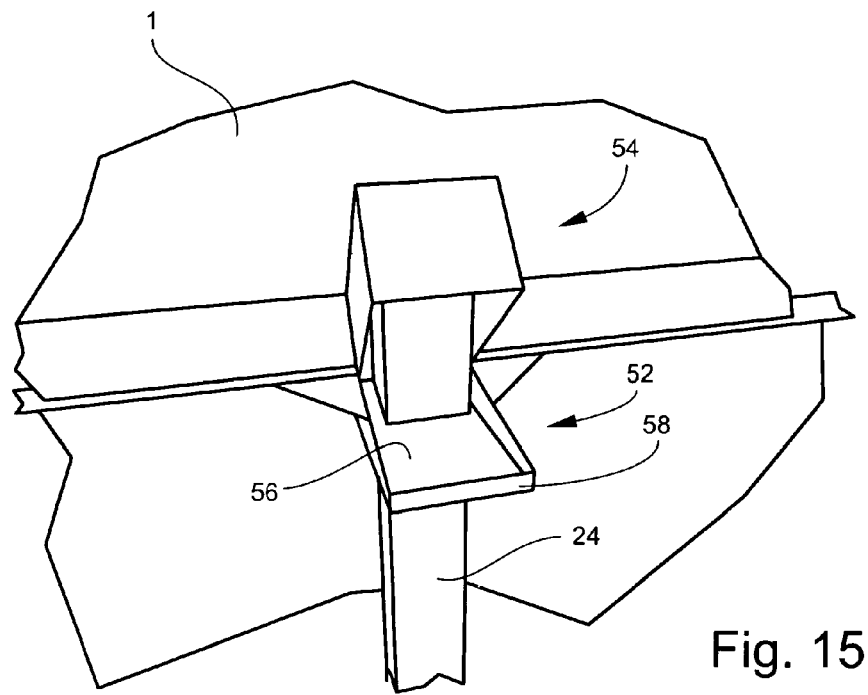
FIG. 15 is a close-up view of the inset in FIG. 13 illustrating the sealing/drainage mechanism of the fourth embodiment.
Figure 16:
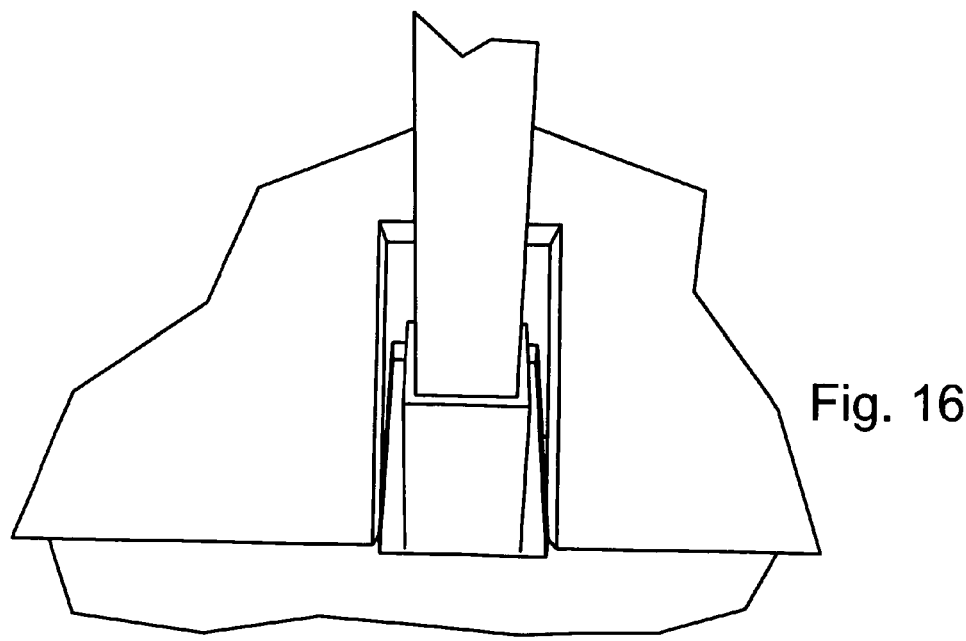
FIG. 16 is a close-up view of the inset in FIG. 14 illustrating the sealing/drainage mechanism of the fourth embodiment.
Figure 17:
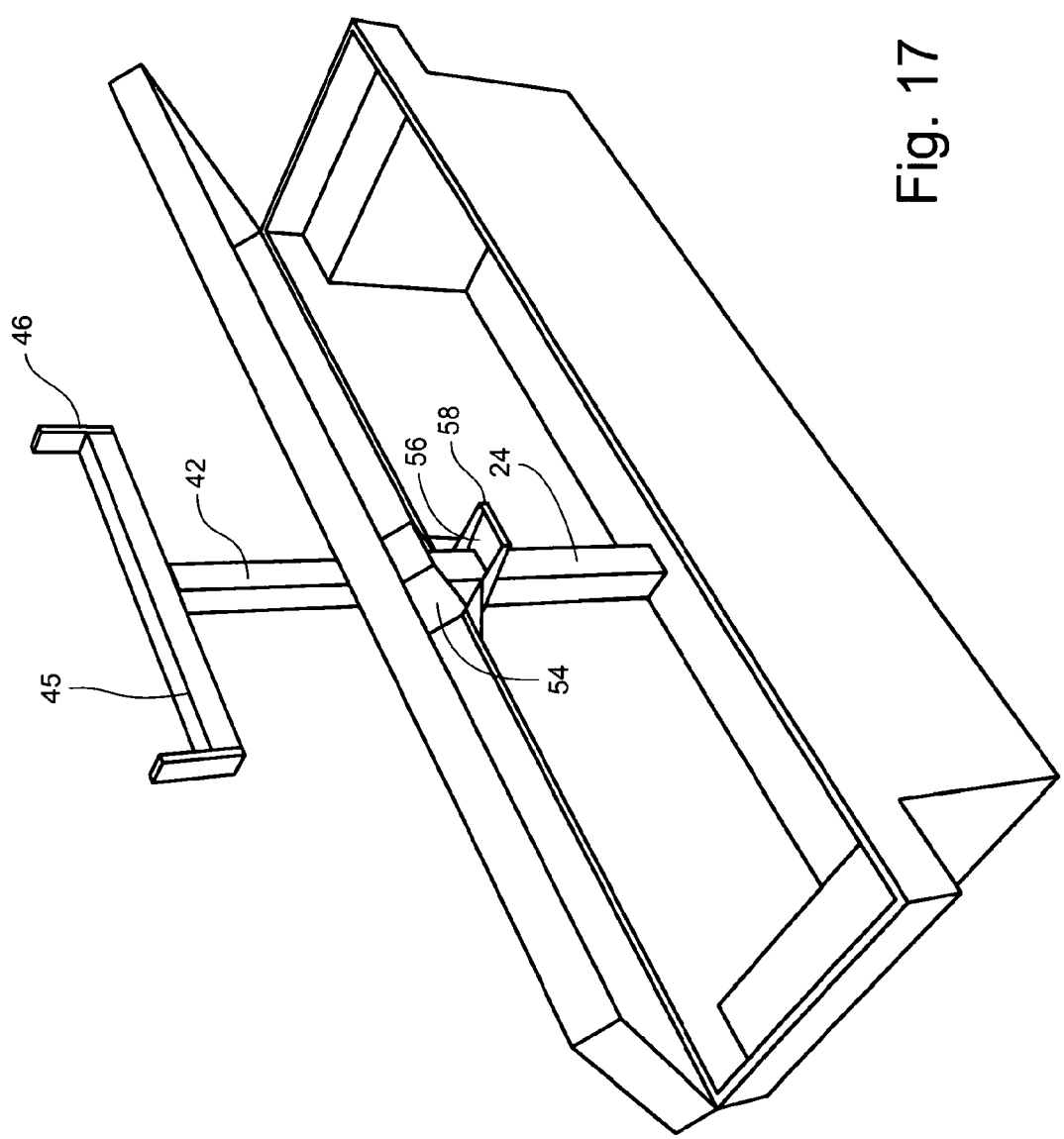
FIG. 17 is yet another view of the fourth embodiment.

In a third preferred embodiment, illustrated in FIG. 9 through FIG. 11, the rack 10 is incorporated directly into a toolbox 1. In this embodiment, there is a single vertical support 24 attached directly to the interior of the toolbox 1. In the lid of the toolbox 1 there is an aperture located directly over the vertical support 24. There is also a removable rack section 40.

In all of these embodiments the preferred form of the rack section 40 comprises of two pieces, a stem section 42 and prong section 44. The stem section 42 is a piece that removable spans the distance between the base section 20 and the prong section 44. Preferably, the stem section 42 is sized to mate with the vertical support 24 or movable vertical support 24'. Moreover, its length can be variable, but is preferably a single fixed length, one sufficient to put the prong section 44 over the toolbox.

In the preferred embodiment the prong section 44 comprises a horizontal bar 45 with retaining projections 46 at each end of the horizontal bar 45. There may also be a mating section 48 that is located at a generally central point of the horizontal bar 45. The mating section 48 is sized to mate with the stem section 42. In one embodiment, the horizontal bar 45 is of a fixed length, but in a second embodiment, the horizontal bar 45 is variable in length, thereby allowing loads of different widths to be secured to the toolbox 1.

In a fourth preferred embodiment, illustrated in FIG. 12 through 18, the rack 10 is incorporated directly into a toolbox 1. In this embodiment, there is a single vertical support 24 attached directly to the interior of the toolbox 1. In the lid of the toolbox 1 there is an aperture located directly over the vertical support 24. There is also a removable rack section 40.

In this fourth embodiment, there is also included a sealing/drainage structure 50 that comprises a pan portion 52 and a seal portion 54. The pan portion 52 is attached to the top of the vertical support 24 so as to form a water receiving lip that channels any water or detritus out of the interior of the toolbox 1. The pan portion 52 comprises a base portion 56 and a lip 58 that runs around most, but not all of the base portion 56. That part of the base portion 56 that does not have a portion of the lip 58 is immediately adjacent the back of the toolbox 1 thereby allowing water to pool in the pan portion 52 and run out of the toolbox 1 without draining into the toolbox 1.

In order to ensure that water does not enter the interior of the toolbox 1, the seal portion 54 extend from the underside of the top of the toolbox 1 far enough to mate with the base portion 56 of the sealing/drainage structure 50. This seal is not complete since there is left a small channel or gap between the portions of the seal portion 54 that is immediately adjacent the back of the toolbox 1, thereby encouraging any water to drain out, down the back of the toolbox 1 and not into the toolbox 1. If necessary, gasketing material may attached to either the pan portion 52 or the seal portion 54 in order to encourage a water tight seal between the pan portion 52 and the seal portion 54 (except in the area of the above noted gap).

Figure 18:
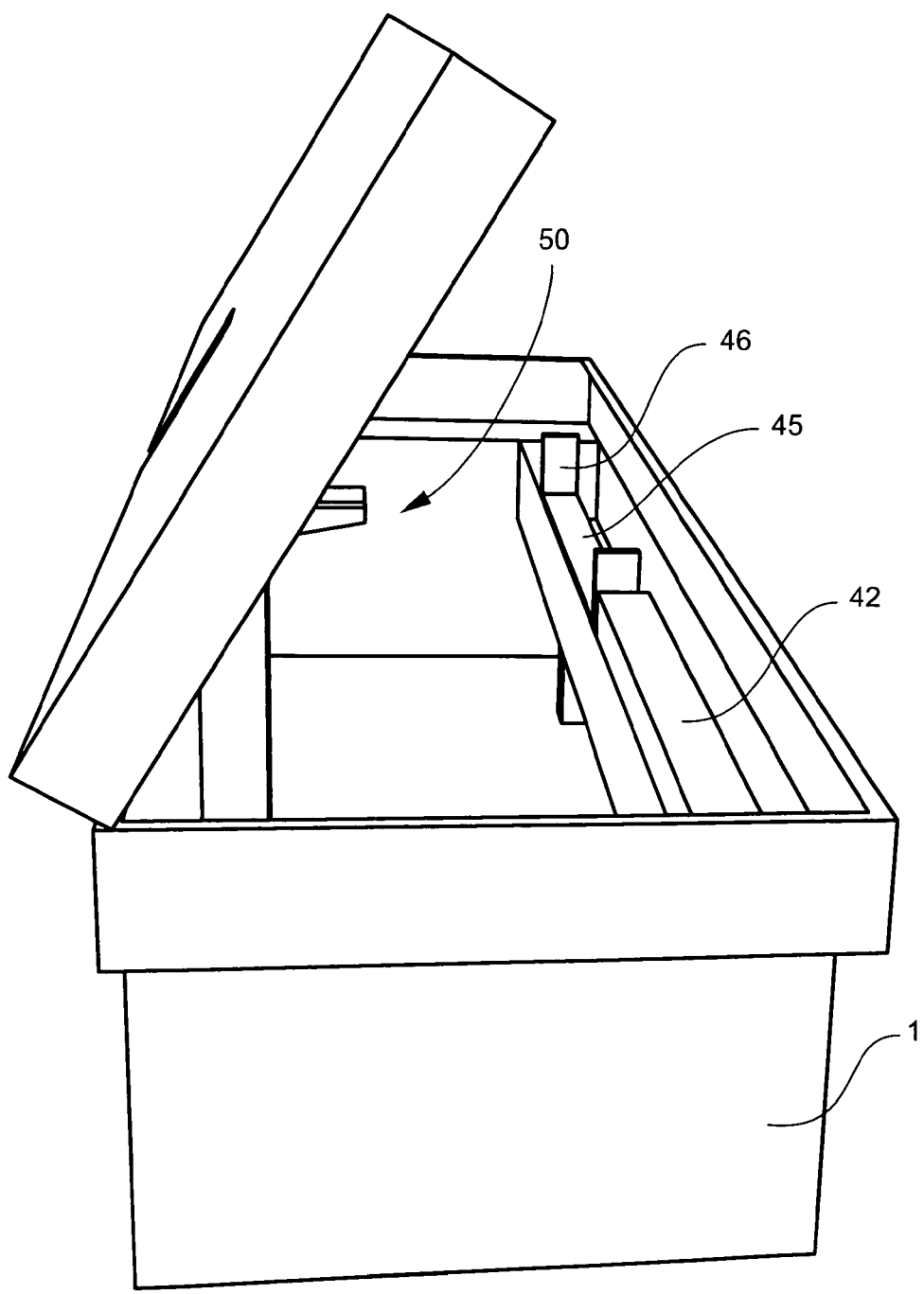
FIG. 18 illustrates the storability of the removable rack section, according to the present invention.

As illustrated in FIG. 18, the components of the removable rack section 40 are storable within the toolbox 1.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:
1. A watertight toolbox, comprising:
  a toolbox comprising an interior configured to receive tools;
  a vertical support coupled to the interior of the toolbox;
  a toolbox lid comprising an opening formed through the toolbox lid and positioned so the vertical support passes through opening when the toolbox lid is closed;

a removable rack releasably coupled to the interior of the toolbox through the opening in the toolbox lid, the removable rack being sized to mate with the vertical support; and a sealing draining structure comprising:
 a pan coupled to the vertical support and formed to channel water away from the interior of the toolbox and down a back of the toolbox, and
 a seal portion coupled to an underside of the toolbox lid and disposed over the pan.

2. The watertight toolbox of claim 1, wherein the opening in the toolbox lid allows the toolbox lid to open and close for allowing access to the interior of the toolbox while the removable rack is coupled to the toolbox and extends through the opening of the toolbox lid.

3. The watertight toolbox of claim 2, wherein the removable rack is sized to be stowed within the interior of the toolbox when the removable rack has been removed from the opening in the toolbox lid and the toolbox lid is closed.

4. The watertight toolbox of claim 2, wherein the removable rack further comprises:
 a stem section formed of a vertical bar with a first end sized to be inserted through the opening in the toolbox lid; and
 a prong section formed of a horizontal bar configured to be releasably coupled to a second end of the stem section opposite the first end of the stem section.

5. The watertight toolbox of claim 1, wherein the pan comprises a base portion and a lip disposed around most but not all of the base portion to channel water down the back of the toolbox.

6. The watertight toolbox of claim 5, wherein the seal portion comprises a channel adjacent the back of the toolbox to drain water down the back of the toolbox.

7. The watertight toolbox of claim 5, wherein the pan is coupled to a top of the vertical support.

8. A watertight toolbox, comprising:
 a toolbox comprising an interior configured to receive tools;
 a vertical support coupled to the interior of the toolbox;
 a toolbox lid comprising an opening formed through the toolbox lid and positioned so the vertical support passes through the opening when the toolbox lid is closed; and
 a sealing draining structure positioned to channel water away from the interior of the toolbox, the sealing drain structure comprising a pan coupled to the vertical support and a seal portion disposed over the pan.

9. The watertight toolbox of claim 8, further comprising a removable rack releasably coupled to the interior of the toolbox through the opening in the toolbox lid, the removable rack being sized to mate with the vertical support.

10. The watertight toolbox of claim 9, wherein the opening in the toolbox lid allows the toolbox lid to open and close for allowing access to the interior of the toolbox while the removable rack is coupled to the toolbox and extends through the opening of the toolbox lid.

11. The watertight toolbox of claim 8, wherein the removable rack is sized to be stowed within the interior of the toolbox when the removable rack has been removed from the opening in the toolbox lid and the toolbox lid is closed.

12. The watertight toolbox of claim 9, wherein the removable rack further comprises:
 a stem section formed of a vertical bar with a first end sized to be inserted through the opening in the toolbox lid; and
 a prong section formed of a horizontal bar configured to be releasably coupled to a second end of the stem section opposite the first end of the stem section.

13. A watertight toolbox, comprising:
 a toolbox comprising an interior configured to receive tools;
 a vertical support coupled to the interior of the toolbox; and
 a toolbox lid comprising an opening formed through the toolbox lid and positioned so the vertical support passes through the opening when the toolbox lid is closed, the toolbox further comprising a sealing draining structure, the sealing drain structure comprising a pan coupled to the vertical support and a seal portion disposed over the pan.

14. The watertight toolbox of claim 13, further comprising a removable rack releasably coupled to the interior of the toolbox through the opening in the toolbox lid, the removable rack being sized to mate with the vertical support.

15. The watertight toolbox of claim 13, wherein the opening in the toolbox lid allows the toolbox lid to open and close for allowing access to the interior of the toolbox when the vertical support is positioned such that a height of a top of the vertical support is higher than a top of the toolbox lid when the toolbox lid is closed.

16. The watertight toolbox of claim 14, wherein the removable rack is sized to be stowed within the interior of the toolbox when the removable rack has been removed from the vertical support and the toolbox lid is closed.

17. The watertight toolbox of claim 16, wherein the removable rack further comprises:
 a stem section formed of a vertical bar with a first end sized to be inserted through the opening in the toolbox lid; and
 a prong section formed of a horizontal bar configured to be releasably coupled to a second end of the stem section opposite the first end of the stem section.

\* \* \* \* \*